US010253508B2

(12) United States Patent
Gazzotti

(10) Patent No.: US 10,253,508 B2
(45) Date of Patent: Apr. 9, 2019

(54) PREFABRICATED MODULAR JOINING ASSEMBLY FOR AN INDUSTRIAL FLOORING AND METHOD FOR MAKING IT

(71) Applicant: EDIL NOLI S.R.L., Milan (IT)

(72) Inventor: Libero Gazzotti, Milan (IT)

(73) Assignee: EDIL NOLI S.R.L., Milan (IT)

( * ) Notice: Subject to any disclaimer, the term of this patent is extended or adjusted under 35 U.S.C. 154(b) by 0 days.

(21) Appl. No.: 15/229,038

(22) Filed: Aug. 4, 2016

(65) Prior Publication Data

US 2017/0037644 A1 Feb. 9, 2017

(30) Foreign Application Priority Data

Aug. 5, 2015 (IT) .................. 102015000042401

(51) Int. Cl.
| E04C 1/00 | (2006.01) |
| E04F 15/10 | (2006.01) |
| E01C 11/06 | (2006.01) |
| E01C 11/10 | (2006.01) |
| E01C 11/12 | (2006.01) |

(Continued)

(52) U.S. Cl.
CPC ............ *E04F 15/105* (2013.01); *B29C 39/10* (2013.01); *B29C 39/36* (2013.01); *E01C 11/06* (2013.01); *E01C 11/106* (2013.01); *E01C 11/126* (2013.01); *E04F 15/02011* (2013.01); *E04F 15/02183* (2013.01); *B29K 2705/00* (2013.01); *B29L 2031/10* (2013.01)

(58) Field of Classification Search
CPC .............. E04F 15/105; E04F 15/02183; E04F 15/02011; B29C 39/36; B29C 39/10; B29L 2031/10; B29K 2705/00

USPC ............................................ 52/309.16, 220.2
See application file for complete search history.

(56) References Cited

U.S. PATENT DOCUMENTS

| 3,363,522 A * | 1/1968 | Gaibreath ............... E01D 19/06 14/73.1 |
| 3,758,220 A * | 9/1973 | Hein ...................... E01D 19/06 404/67 |

(Continued)

FOREIGN PATENT DOCUMENTS

WO 2013/057299 A1 4/2013

OTHER PUBLICATIONS

Italian Patent Office Search Report and Written Opinion dated Mar. 23, 2016 (partially in English).

*Primary Examiner* — Basil S Katcheves
(74) *Attorney, Agent, or Firm* — Hedman & Costigan, P.C.; James V. Costigan; Kathleen A. Costigan

(57) ABSTRACT

A prefabricated modular joining assembly for an industrial flooring comprising a module including a prismatic body formed by two half-portions, being separated from one another by a deformable material zone, said half-portions being made of a synthetic resin and having a metal reinforcing framework embedded therein. The joining assembly is made by a method comprising the steps of: providing a box caisson; arranging a rubber membrane in the box caisson thereby separating two zones of the box caisson; arranging in the two zones a reinforcing metal framework; casting a resin material in the box caisson thereby embedding the reinforcing metal framework therein; removing, upon setting of the resin, the module thus formed; and applying the module in a recess formed in a floor at a joint to be restored.

4 Claims, 6 Drawing Sheets

(51) Int. Cl.
  *B29C 39/10* (2006.01)
  *B29C 39/36* (2006.01)
  *E04F 15/02* (2006.01)
  *B29K 705/00* (2006.01)
  *B29L 31/10* (2006.01)

(56) References Cited

U.S. PATENT DOCUMENTS

| | | | | |
|---|---|---|---|---|
| 3,829,229 | A * | 8/1974 | Britton | E01D 19/06 404/69 |
| 3,977,802 | A * | 8/1976 | Galbreath | E01D 19/06 14/73.1 |
| 4,015,302 | A * | 4/1977 | Clark | E01D 19/067 14/73.1 |
| 4,067,155 | A * | 1/1978 | Ruff | E04B 1/6803 4/498 |
| 4,080,086 | A * | 3/1978 | Watson | E01D 19/06 404/69 |
| 4,098,047 | A * | 7/1978 | Weber | E04B 1/6807 404/68 |
| 4,784,516 | A * | 11/1988 | Cox | E01C 11/10 14/73.1 |
| 6,491,468 | B1 * | 12/2002 | Hagen | E04B 1/6803 277/316 |
| 8,302,357 | B1 * | 11/2012 | Nolte | E02D 31/002 52/220.2 |
| 2012/0308303 | A1 * | 12/2012 | Gallai | E01C 11/103 404/66 |
| 2014/0242863 | A1 * | 8/2014 | Voet | E01C 11/10 442/59 |
| 2017/0029615 | A1 * | 2/2017 | He | C08L 67/02 |

* cited by examiner

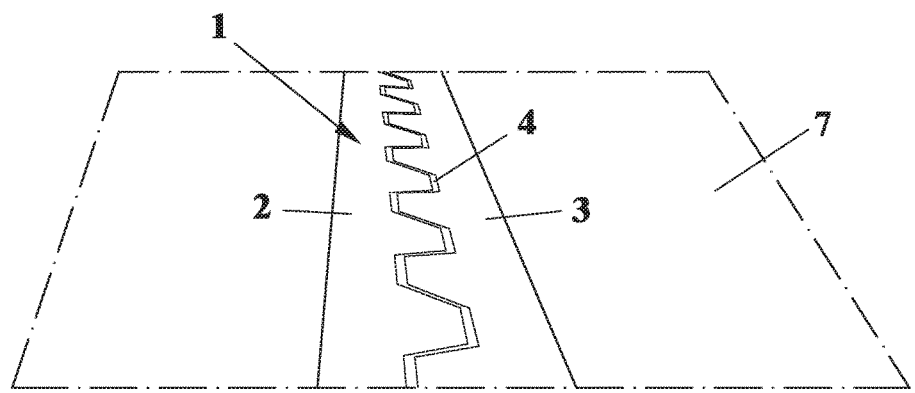
FIG. 6
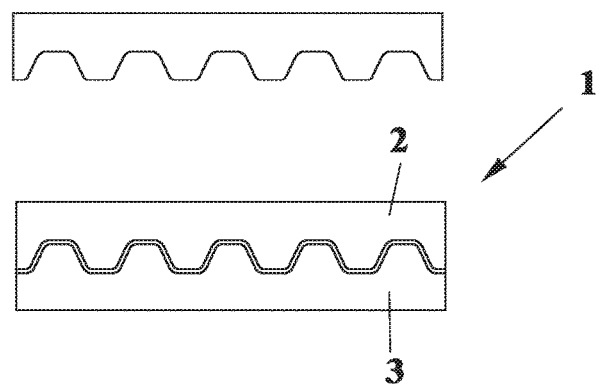
FIG. 7
FIG. 8
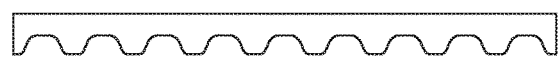

PREFABRICATED MODULAR JOINING ASSEMBLY FOR AN INDUSTRIAL FLOORING AND METHOD FOR MAKING IT

BACKGROUND OF THE INVENTION

The present invention relates to a prefabricated modular joining assembly or joint particularly for industrial floorings, and a method for making said joint.

As is known, concrete industrial flooring joints are quickly degraded because of several degrading factors, such as thermal variations, high weight means traffic and so on.

A degradation of the jointed connections causes a lot of serious drawbacks.

At first, the planar arrangement of the flooring at the joining region is negatively affected, with a consequent early degradation of the vehicle moving means, in particular the vehicle wheels.

Such a degraded junction moreover causes impacts and blows, with a great disadvantage for transport means and operators, which disadvantages could also cause professional diseases.

Joint systems to be applied to degraded joints thereby restoring their functionality are already known.

A type of restoring joint, for example, is disclosed in the International Patent Application published under No. WO2013/057299, which relates to a joint construction adapted to be applied to a degraded junction of a reinforced concrete flooring.

According to the disclosure of WO2013/057299, the degraded joining region is at first prepared by making a rectangular cross section seat or recess in which is applied an elastomeric material plate whose size is so designed as to be made perfectly adhering to the inner walls of the seat or recess.

Then, an insulating rubber plate is glued on the elastomeric plate and then, after having applied a primer material, a resin mortar material being further applied.

Said resin mortar material is so applied as to be introduced between two joining elements, also made of a resin material, and arranged in said seat or recess. The two joint or joining elements have a mating corrugated surface.

The joint construction disclosed in WO2013/057299 is fully made on site, and only the two joint elements are preliminary made by extruding or injection molding.

An assembling of the joints made by the above disclosed method is very difficult and requires a long processing time.

SUMMARY OF THE INVENTION

The aim of the present invention is to provide a prefabricated modular joining assembly or joint, particularly for industrial floorings, which may be made and installed in a very short time and by very simple installing operations.

Within the scope of the above mentioned aim, a main object of the invention is to provide such a joint assuring a long duration and without maintenance operations.

Another object is to provide such a joint allowing to achieve improved technical performances compared to the above mentioned prior art.

Yet another object of the present invention is to provide such a construction which is competitive from an economic standpoint.

Yet another object of the present invention is to provide such a construction which, owing to its specifically designed structural features, is very reliable and safe in operation.

According to one aspect of the present invention, the above mentioned aim and objects, as well as yet other objects, which will become more apparent hereinafter, are achieved by a prefabricated modular joining assembly, particularly for industrial floorings, characterized in that said prefabricated modular joining assembly comprises a module including a prismatic body formed by two half-portions, being separated from one another by a deformable material zone, said half-portions being made of a synthetic resin and having a metal reinforcing framework embedded therein.

The above mentioned objects, as well as yet other objects, which will become more apparent hereinafter, are moreover achieved by a method for making a prefabricated modular joining assembly, particularly for an industrial flooring, characterized in that said method comprises the steps of:
 providing a box caisson;
 arranging a rubber membrane in said box caisson thereby separating two zones of said box caisson;
 arranging in said two zones a reinforcing metal structure;
 casting a resin material in said box caisson thereby embedding said reinforcing metal structure therein;
 removing, upon setting of the resin, the module thus formed; and
 applying said module in a recess formed in a floor at a joint to be restored.

BRIEF DESCRIPTION OF THE DRAWINGS

Further characteristics and advantages of the present invention will become more apparent hereinafter from the following detailed disclosure of a preferred, though not exclusive, embodiment of the invention which is illustrated, by way of an indicative but not limitative example, in the accompanying drawings, where:

FIG. 6 is a further perspective view of the modular joining assembly applied to a flooring;

FIG. 7 shows a modular joining assembly having a length of 1000 mm and a width of 250 mm, with a related template for making the joining assembly; and FIG. 8 shows a half of a modular joining assembly having a length of 1000 mm and a width of 120 mm, with a related template for making it.

DESCRIPTION OF THE PREFERRED EMBODIMENTS

Figure 1:
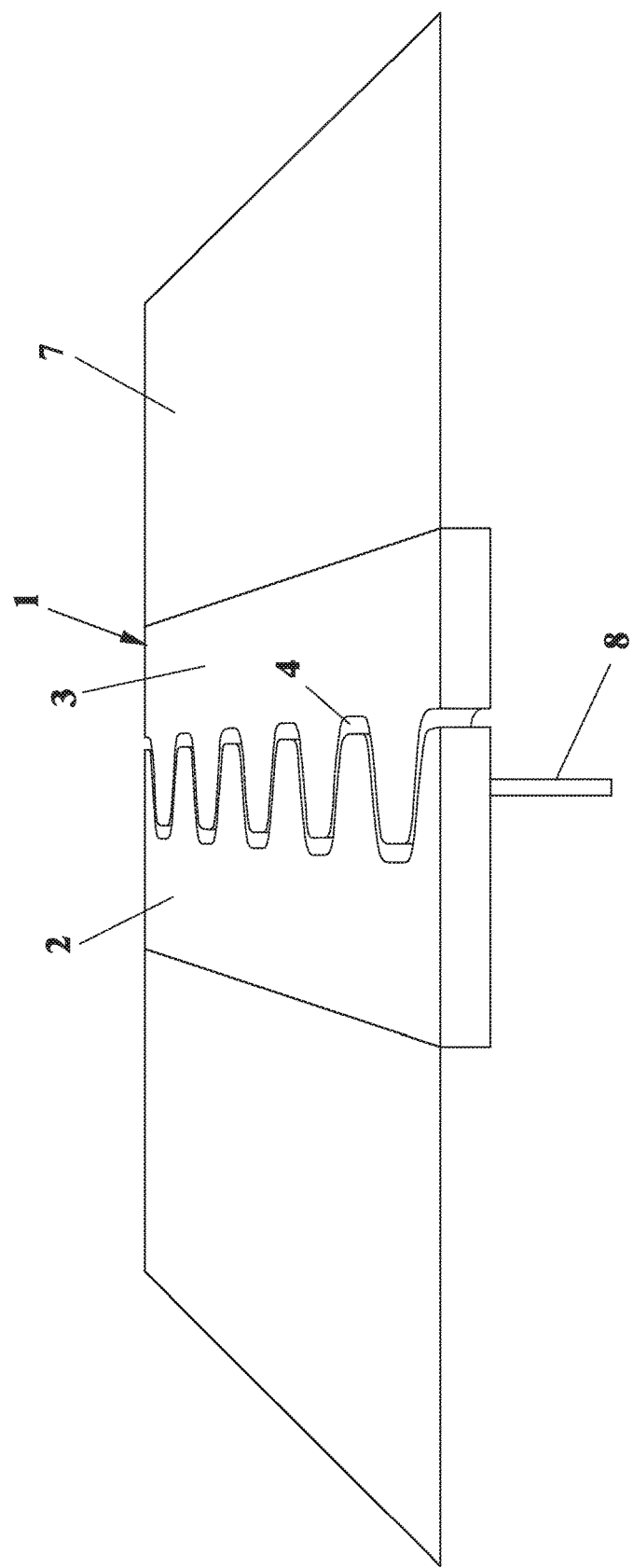
FIG. 1 is a perspective view schematically showing the prefabricated modular joining assembly according to the present invention, being installed in a flooring.
Figure 2:
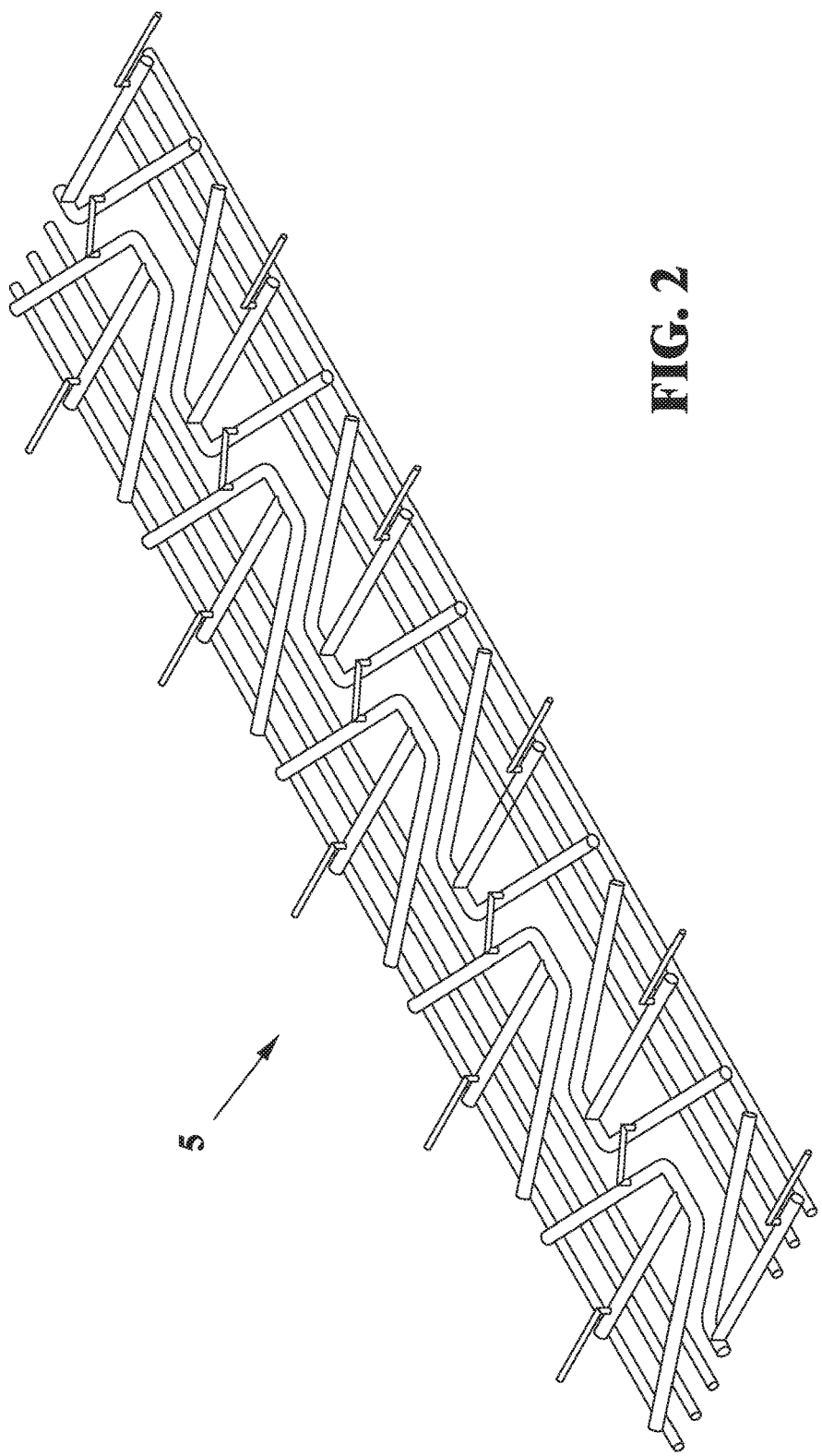
FIG. 2 is a perspective view showing the framework of the joining assembly.
Figure 3:
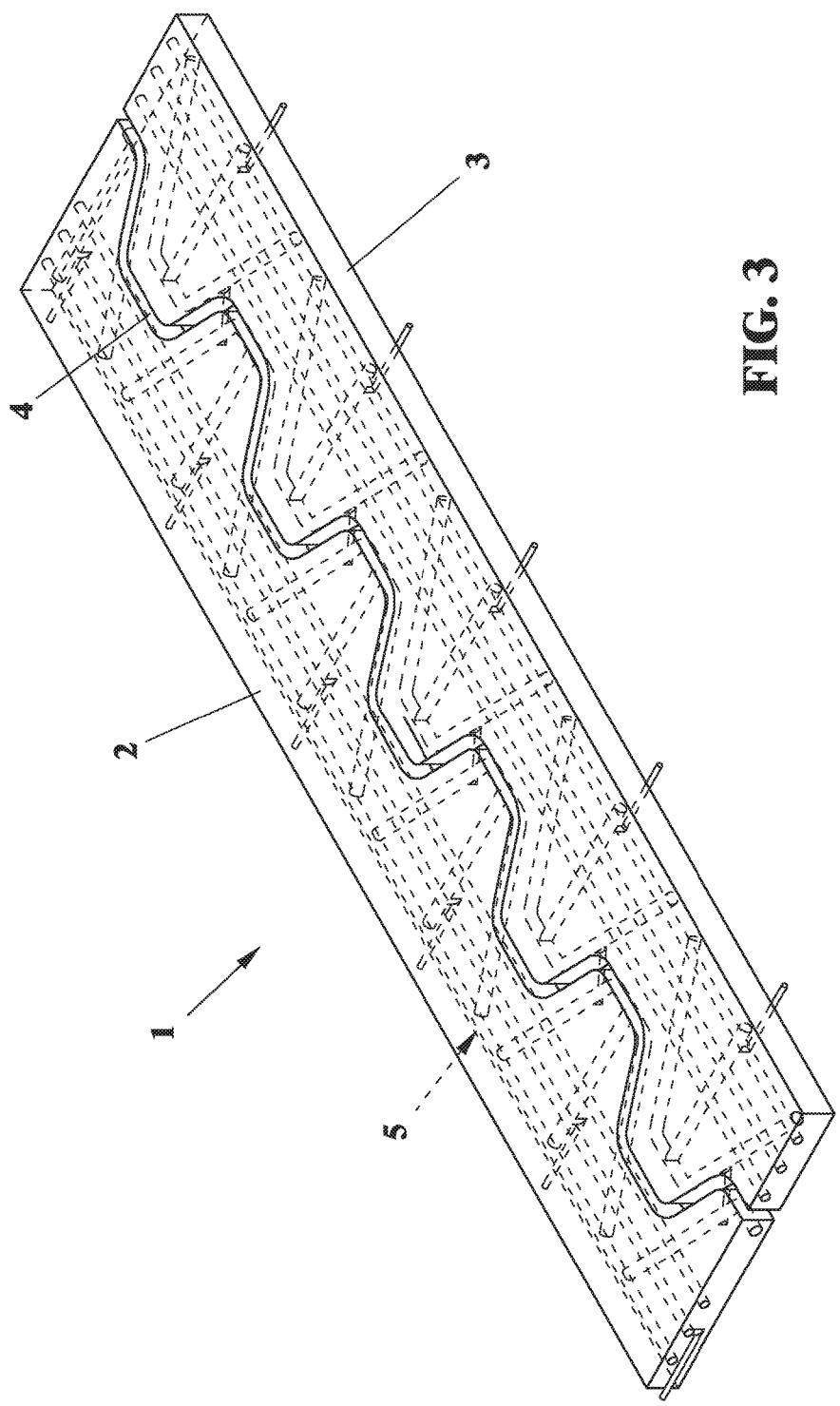
FIG. 3 is a perspective view, shown in a partially see-through condition, of the mounted joining assembly.
Figure 4:
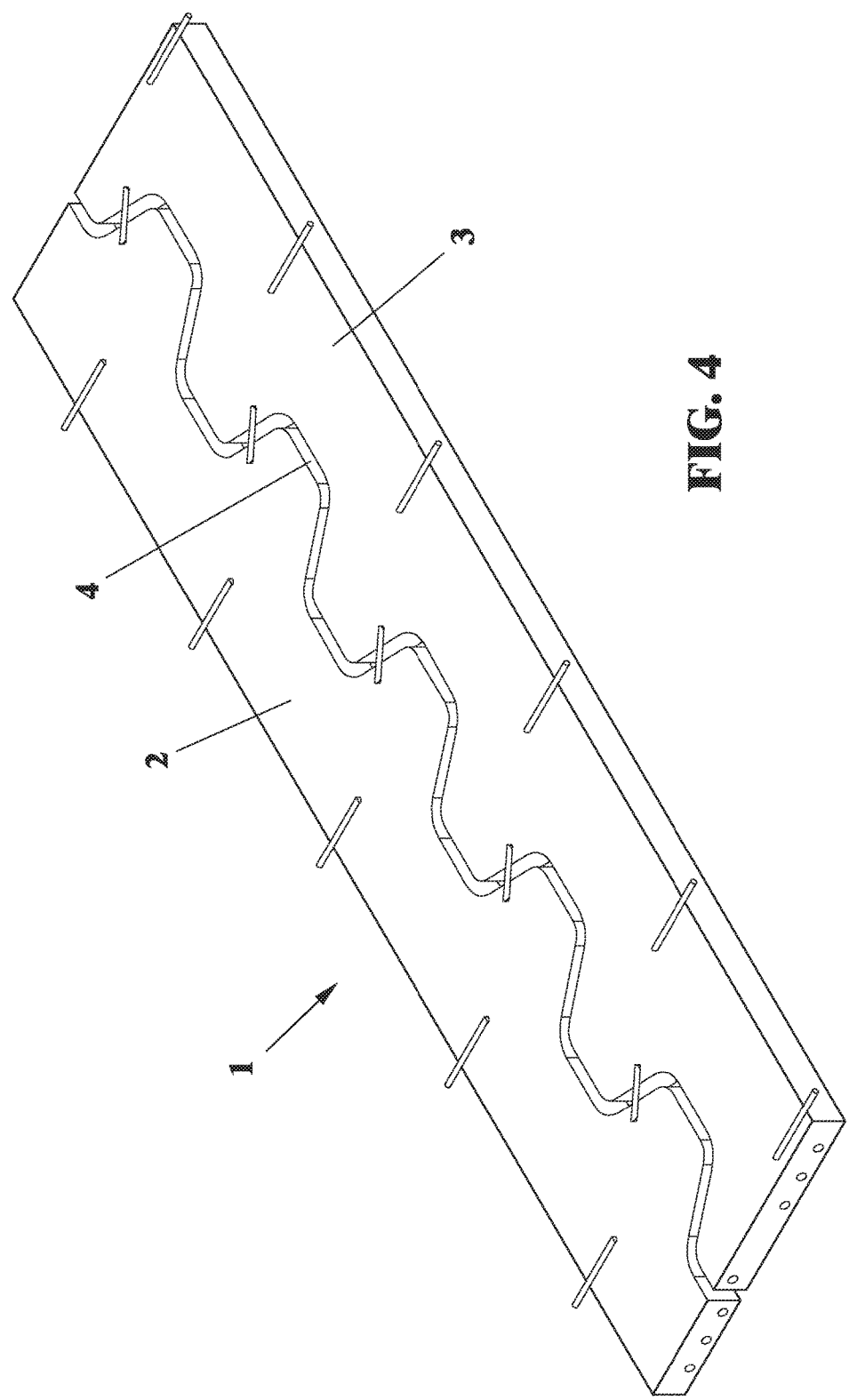
FIG. 4 is a further perspective view of the mounted joining assembly.
Figure 5:
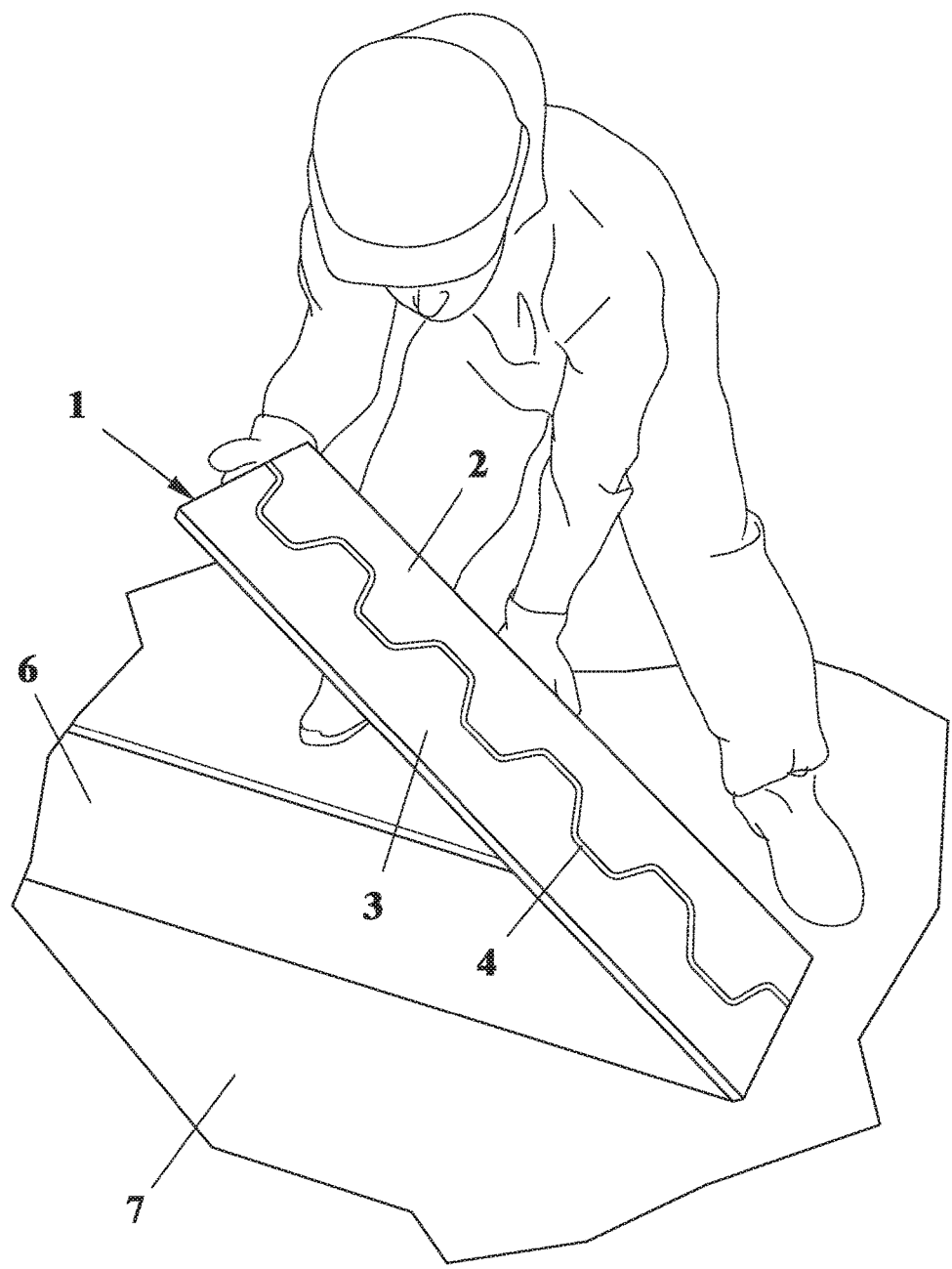
FIG. 5 shows an operating step for installing the modular joining assembly according to the present invention.

With reference to the number references of the above mentioned figures, the prefabricated modular joining assembly, particularly designed for industrial floorings, according to the present invention, and being generally indicated by the reference number 1, comprises a module including a prismatic body, formed by two half-portions indicated by the reference numbers 2 and 3 respectively, being separated from one another by a deformable material zone 4.

The half-portions 2 and 3 are made of a synthetic resin and have a metal reinforcing framework 5 embedded therein.

The modular joining assembly according to the present invention is made by providing a box caisson, in which is arranged a rubber membrane provided for constituting the movable part of the joining assembly, that is the deformable material zone 4.

Said rubber membrane is preferably a membrane made of EPDM (Ethylene-Propylene Diene Monomer).

Inside said box caisson is moreover arranged the metal structure 5 operating as a reinforcing framework for the joining assembly.

Then, a special resin is cast, thereby embedding said reinforcing metal structure therein.

As the resin is set, the module 1 is removed, said module being ready to be arranged in a recess 6, suitably formed in the floor 7, at the joining zone 8 to be restored.

Advantageously, the prefabricated joining assembly according to the present invention may be made in the form of modules having different dimensions, thereby meeting different application requirements.

By way of an example, the joining assembly may be made in the form of two modules having the followings characteristics:

Basic module:
module length: 1,000 mm
module width: 250 mm
module height: 25 mm
maximum gap of the already existing joining assembly: 29 mm
maximum horizontal movement: 15 mm
compression strength: 90 N/mm$^2$
bending strength: 75 N/mm$^2$
color: concrete grey.

Reduced dimension module:
module length: 1,000 mm
module width: 120 mm
module height: 25 mm
maximum gap of the already existing joining assembly: 29 mm
maximum horizontal movement: 15 mm
compression strength: 90 N/mm$^2$
bending strength: 75 N/mm$^2$
color: concrete grey The prefabricated composite material joining assembly according to the present invention may be installed at the old degraded joints and is particularly suitable to be subjected to a heavy traffic, of an industrial type.

The modular joining assembly according to the present invention assures a proper planarity and continuity of the flooring, while preventing any early degradation of the vehicle moving means, in particular their wheels.

Moreover, the joining assembly according to the present invention eliminates impacts and blows, with self-evident advantages both for the operators and with respect to a reduction of possible professional diseases.

Moreover, the joint allows vertical and horizontal movements of the flooring, and may be applied in a perfectly adhered condition to the existing support, thereby constituting an integrating part of the flooring.

A main advantage of the prefabricated joining assembly according to the present invention is that it does not deteriorate over time and does not require maintenance.

It has been found that the invention fully achieves the intended aim and objects.

In fact, a joining assembly has been provided, which, differently from prior joining assemblies, is fully prefabricated and whose installation is very quick and simple; in fact, the joining assembly according to the present invention will be adapted to perfectly operate within twelve hours.

Moreover, the method for making and installing said modular joining assembly allows to achieve a joint with an improved performance compared to prior joints.

For example, the technical characteristics of the joint according to the present invention may be favorably compared to and are patentably novel and inventive over the features of a joint made according to the system disclosed in WO2013/057299; in fact, the inventive joining assembly or joint provides a compression strength of 90 N/mm$^2$, instead of a compression strength of 80 N/mm$^2$ of the joint disclosed in WO2013/057299; the inventive joining assembly moreover provides a bending strength of 75 N/mm$^2$ instead of a bending strength of 65 N/mm$^2$ of the joint disclosed in WO2013/057299.

Moreover, the joining assembly according to the present invention may be clearly patentably distinguished from the mentioned prior joint since it is made in a fully prefabricated manner, differently from the joint disclosed in WO2013/057299, in which the two half-portions constituting said joint, and the resilient material separating said portions, are assembled in situ with a very complex and long operation.

Moreover, the mechanical strength and duration characteristics of the inventive joining assembly are assured by the disclosed reinforcing framework included in the module.

In practicing the invention, the materials used, as well as the contingent size and shapes can be any, depending on requirements.

The invention claimed is:

1. A method for making a prefabricated modular joining assembly and incorporating said prefabricated modular joining assembly in an industrial flooring, comprising the steps of:
   providing a box caisson;
   arranging a rubber membrane in said box caisson thereby separating two zones of said box caisson;
   arranging in said two zones a reinforcing metal structure;
   casting a resin material in said box caisson in said two zones thereby embedding said reinforcing metal structure in said resin material at said two zones and thereby forming two half-portions;
   removing from said box caisson, upon setting of the resin, the prefabricated module joining assembly thus formed having a shape of a prism and being constituted by said two half-portions, said deformable material element, and said metal reinforcing structure; and
   arranging said prefabricated module joining assembly in a recess formed in said industrial flooring at a joint to be restored after removing said prefabricated module joining assembly from said box caisson and thereby incorporating said prefabricated module joining assembly in said industrial flooring.

2. The method according to claim 1, wherein said rubber membrane is made of an EPDM (Ethylene-Propylene Diene Monomer) material.

3. The method according to claim 1, comprising providing said prefabricated joining assembly with the following characteristics:
   module length: 1,000 mm
   module width: 250 mm
   module height: 25 mm
   maximum gap of the already existing joining assembly: 29 mm maximum horizontal movement: 15 mm
compression strength: 90 N/mm²
bending strength: 75 N/mm²
color: concrete grey.

4. The method according to claim 1, comprising providing said prefabricated joining assembly with the following characteristics:

module length: 1,000 mm
module width: 120 mm
module height: 25 mm
maximum gap of the already existing joining assembly: 29 mm
maximum horizontal movement: 15 mm
compression strength: 90 N/mm²
bending strength: 75 N/mm²
color: concrete grey.

* * * * *